(12) United States Patent
Ogg et al.

(10) Patent No.: US 7,794,877 B2
(45) Date of Patent: Sep. 14, 2010

(54) BI-POLAR RECHARGEABLE ELECTROCHEMICAL BATTERY

(76) Inventors: Randy Ogg, 28005 NW. 46th Ave., Newberry, FL (US) 32669; David Russell Smith, 3915 Reseda Rd., Waterford, MI (US) 48329; David Fraser Park, 8712 Thendara Blvd., Clarkston, MI (US) 48348

( * ) Notice: Subject to any disclaimer, the term of this patent is extended or adjusted under 35 U.S.C. 154(b) by 1089 days.

(21) Appl. No.: 11/417,489

(22) Filed: May 3, 2006

(65) Prior Publication Data

US 2006/0292443 A1 Dec. 28, 2006

Related U.S. Application Data

(60) Provisional application No. 60/677,512, filed on May 3, 2005.

(51) Int. Cl.
*H01M 10/18* (2006.01)
*H01M 2/08* (2006.01)

(52) U.S. Cl. .................. 429/210; 429/208; 429/185; 429/246

(58) Field of Classification Search ............... 429/210, 429/209, 208, 185, 181, 246; 204/268, 267
See application file for complete search history.

(56) References Cited

U.S. PATENT DOCUMENTS

| | | | |
|---|---|---|---|
| 3,664,877 A | 5/1972 | Shaw | |
| 4,152,492 A | 5/1979 | McCartney et al. | |
| 4,267,243 A | 5/1981 | Park et al. | |
| 4,269,907 A | 5/1981 | Momyer et al. | |
| 4,307,161 A | 12/1981 | Brown | |
| 4,331,745 A | 5/1982 | Catanzarite | |
| 4,352,867 A | 10/1982 | Catanzarite | |
| 4,385,101 A | 5/1983 | Catanzarite | |
| 4,542,082 A | 9/1985 | Rowlette | |
| 4,565,749 A | 1/1986 | Van Ommering et al. | |
| 4,567,119 A | 1/1986 | Lim | |
| 4,614,025 A | 9/1986 | Van Ommering et al. | |
| 4,828,939 A | 5/1989 | Turley et al. | |
| 4,894,299 A | 1/1990 | Morse | |
| 4,909,955 A | 3/1990 | Morris et al. | |

(Continued)

FOREIGN PATENT DOCUMENTS

DE   39 16 050 A1   11/1990

(Continued)

OTHER PUBLICATIONS

Reisner et al., "Bipolar Nickel-Metal Hydride Battery for Hybrid Vehicles," Aerospace and Electronic Systems Magazine, IEEE, vol. 9, Issue 5, pp. 24-28, May 1994.

(Continued)

*Primary Examiner*—Raymond Alejandro
(74) *Attorney, Agent, or Firm*—Ropes & Gray LLP

(57) ABSTRACT

A bi-polar battery has a positive electrode unit, a negative electrode unit, at least one bi-polar electrode unit stacked therebetween, an electrolyte layer separating each adjacent electrode unit, and a gasket positioned about each electrolyte layer for creating a seal about the electrolyte layer in conjunction with the electrode units adjacent thereto. The bi-polar battery also includes a wrapper for maintaining the seals created by the gaskets.

9 Claims, 13 Drawing Sheets

U.S. PATENT DOCUMENTS

| | | | |
|---|---|---|---|
| 4,927,717 A | 5/1990 | Turley et al. | |
| 4,964,878 A | 10/1990 | Morris | |
| 5,141,828 A | 8/1992 | Bennion et al. | |
| 5,145,752 A | 9/1992 | Goldstein et al. | |
| 5,185,218 A | 2/1993 | Brokman et al. | |
| 5,190,833 A | 3/1993 | Goldstein et al. | |
| 5,344,723 A | 9/1994 | Bronoel et al. | |
| 5,389,464 A | 2/1995 | Specht | |
| 5,393,617 A | 2/1995 | Klein | |
| 5,409,787 A | 4/1995 | Blanyer et al. | |
| 5,411,818 A * | 5/1995 | Barlow et al. | 429/185 |
| 5,464,453 A | 11/1995 | Tong et al. | |
| 5,478,363 A | 12/1995 | Klein | |
| 5,552,243 A | 9/1996 | Klein | |
| 5,561,380 A | 10/1996 | Sway-Tin et al. | |
| 5,567,544 A | 10/1996 | Lyman | |
| 5,582,622 A | 12/1996 | Lafollette | |
| 5,585,142 A | 12/1996 | Klein | |
| 5,595,839 A | 1/1997 | Hossain | |
| 5,611,823 A | 3/1997 | Klein | |
| 5,652,073 A | 7/1997 | Lenhart et al. | |
| 5,656,388 A | 8/1997 | Bugga et al. | |
| 5,666,041 A | 9/1997 | Stuart et al. | |
| 5,698,342 A | 12/1997 | Klein | |
| 5,698,967 A | 12/1997 | Baer et al. | |
| 5,711,988 A | 1/1998 | Tsai et al. | |
| 5,752,987 A | 5/1998 | Yang | |
| 5,766,789 A | 6/1998 | James et al. | |
| 5,821,009 A | 10/1998 | Hall | |
| 5,882,817 A | 3/1999 | Hall et al. | |
| 5,916,709 A | 6/1999 | Arias et al. | |
| 5,980,977 A | 11/1999 | Deng et al. | |
| 5,982,143 A | 11/1999 | Stuart | |
| 6,063,525 A | 5/2000 | LaFollette | |
| 6,074,774 A | 6/2000 | Semmens et al. | |
| 6,190,795 B1 | 2/2001 | Daley | |
| 6,330,925 B1 | 12/2001 | Ovshinsky et al. | |
| 6,399,239 B2 | 6/2002 | Bolstad et al. | |
| 6,413,668 B1 | 7/2002 | Sandberg et al. | |
| 6,503,658 B1 | 1/2003 | Klein et al. | |
| 6,514,296 B1 | 2/2003 | Tsai et al. | |
| 6,557,655 B2 | 5/2003 | Ovshinsky et al. | |
| 6,565,836 B2 | 5/2003 | Ovshinsky et al. | |
| 6,759,034 B2 | 7/2004 | Ovshinsky et al. | |
| 6,806,001 B1 | 10/2004 | Benczur-Uermoessy et al. | |
| 6,824,914 B2 | 11/2004 | Iyer | |
| 6,837,321 B2 | 1/2005 | Ovshinsky et al. | |
| 6,887,620 B2 | 5/2005 | Klein et al. | |
| 6,908,711 B2 | 6/2005 | Fauteux et al. | |
| 6,986,967 B2 | 1/2006 | Barton et al. | |
| 7,097,937 B2 | 8/2006 | Fredriksson et al. | |
| D533,832 S | 12/2006 | Hock | |
| 7,144,654 B2 | 12/2006 | LaFollette et al. | |
| 7,258,949 B2 | 8/2007 | Frederiksson et al. | |
| 7,445,869 B2 | 11/2008 | Puester et al. | |
| 2003/0013007 A1 | 1/2003 | Kaun | |
| 2003/0013016 A1 | 1/2003 | Puester et al. | |
| 2003/0070916 A1 | 4/2003 | Nanno et al. | |
| 2004/0086779 A1 | 5/2004 | Higley et al. | |
| 2004/0157101 A1 | 8/2004 | Smedley | |
| 2004/0161667 A1 | 8/2004 | Fukuzawa et al. | |
| 2004/0219428 A1 | 11/2004 | Nagayama | |
| 2004/0229107 A1 | 11/2004 | Smedley | |
| 2004/0253512 A1 | 12/2004 | Watanabe et al. | |
| 2005/0003270 A1 | 1/2005 | Phillips | |
| 2005/0048371 A1 | 3/2005 | Nagayama et al. | |
| 2005/0069768 A1 | 3/2005 | Martinet et al. | |
| 2005/0084754 A1 | 4/2005 | Klein | |
| 2005/0106456 A1 * | 5/2005 | Puester et al. | 429/185 |
| 2005/0112471 A1 | 5/2005 | Chen et al. | |
| 2005/0123829 A1 | 6/2005 | Fukui et al. | |
| 2005/0147876 A1 | 7/2005 | Izumi et al. | |
| 2006/0292443 A1 | 12/2006 | Ogg et al. | |
| 2008/0070106 A1 | 3/2008 | Hock et al. | |
| 2008/0090146 A1 | 4/2008 | Batson | |
| 2008/0124625 A1 | 5/2008 | Hock et al. | |
| 2009/0023061 A1 * | 1/2009 | Ogg et al. | 429/162 |
| 2009/0053586 A1 | 2/2009 | Fredriksson et al. | |

FOREIGN PATENT DOCUMENTS

| | | |
|---|---|---|
| DE | 196 08 326 A1 | 9/1997 |
| EP | 0 025 663 A2 | 3/1981 |
| EP | 0 039 557 A1 | 11/1981 |
| EP | 0 040 458 A2 | 11/1981 |
| EP | 0 079 226 A1 | 5/1983 |
| EP | 0 188 873 A2 | 7/1986 |
| EP | 0 199 493 A1 | 10/1986 |
| EP | 0 221 347 A1 | 5/1987 |
| EP | 0 255 201 A2 | 2/1988 |
| EP | 0 187 145 B1 | 3/1991 |
| EP | 0 227 830 B1 | 9/1991 |
| EP | 0 221 183 B1 | 4/1992 |
| EP | 0 512 417 A1 | 11/1992 |
| EP | 0 551 204 A1 | 7/1993 |
| EP | 0 730 316 A1 | 9/1996 |
| EP | 0 800 223 A2 | 10/1997 |
| EP | 0 863 560 A2 | 9/1998 |
| EP | 0 863 565 A2 | 9/1998 |
| EP | 0 800 223 B1 | 8/2000 |
| EP | 0 787 365 B1 | 2/2001 |
| EP | 0 755 306 B1 | 1/2002 |
| EP | 1 195 355 A1 | 4/2002 |
| EP | 1 329 973 A1 | 7/2003 |
| EP | 1 418 638 A2 | 5/2004 |
| EP | 1 422 773 A1 | 5/2004 |
| EP | 1 422 780 A1 | 5/2004 |
| EP | 1 427 049 A1 | 6/2004 |
| EP | 1 445 809 A2 | 8/2004 |
| EP | 1 478 035 A2 | 11/2004 |
| EP | 1 482 582 A2 | 12/2004 |
| EP | 1 487 034 A2 | 12/2004 |
| EP | 1 841 001 A1 | 10/2007 |
| FR | 2 677 812 | 12/1992 |
| FR | 2 692 077 | 12/1993 |
| FR | 2 700 639 | 7/1994 |
| GB | 2 060 983 A | 5/1981 |
| GB | 1596106 | 8/1981 |
| GB | 2 150 739 A | 7/1985 |
| GB | 2 278 713 A | 12/1994 |
| GB | 2 294 803 A | 5/2008 |
| JP | 4-95341 | 3/1992 |
| WO | WO 03/032416 A1 | 4/2003 |
| WO | WO 2008/059409 | 5/2008 |
| WO | WO 2008/081280 | 7/2008 |

OTHER PUBLICATIONS

Golben et al., "A Low Pressure Bipolar Nickel Hydrogen Battery," Twelfth Annual Battery Conference on Applications and Advances, pp. 307-312, Jan. 14-17, 1997.

Brown et al., "Bipolar Nickel-Metal Hydride Battery for Hybrid Electric Vehicles," The Fourteenth Annual Battery Conference on Applications and Advances, pp. 19-24, Jan. 12-15, 1999.

Cole et al., "Bipolar Nickel-Metal Hydride Batteries for Aerospace Applications," Aerospace and Electronic Systems Magazine, IEEE, vol. 15, Issue 15, pp. 39-45, Jan. 2000.

Ohms et al., "Alkaline Batteries for Applications in Telecommunication," Telecommunications Energy Special, 2000, Accumulatorenwerke HOPPECKE, Germany, pp. 111-114, May 7-10, 2000.

LaFollette et al., "Microfabricated Secondary Batteries for Remote, Autonomous, Electronic Devices," Sixteenth Annual Battery Conference on Applications and Advances, pp. 349-354, Jan. 9-12, 2001.

Landi et al., "Scale-Up of Manufacturing Processes for a Bipolar Nickel-Metal Hydride Aircraft Battery," Procs. 40th Power Sources Conf., Jun. 10-13, 2002.

Plivelich et al., "Pulse Power Nickel Metal Hydride Battery," 2002 Power Systems Conference, Electro Energy, Inc., 02PSC-69, pp. 1-6, Oct. 29-31, 2002.

Klein et al., "Bipolar Nickel Metal Hydride Battery," 2003.

* cited by examiner

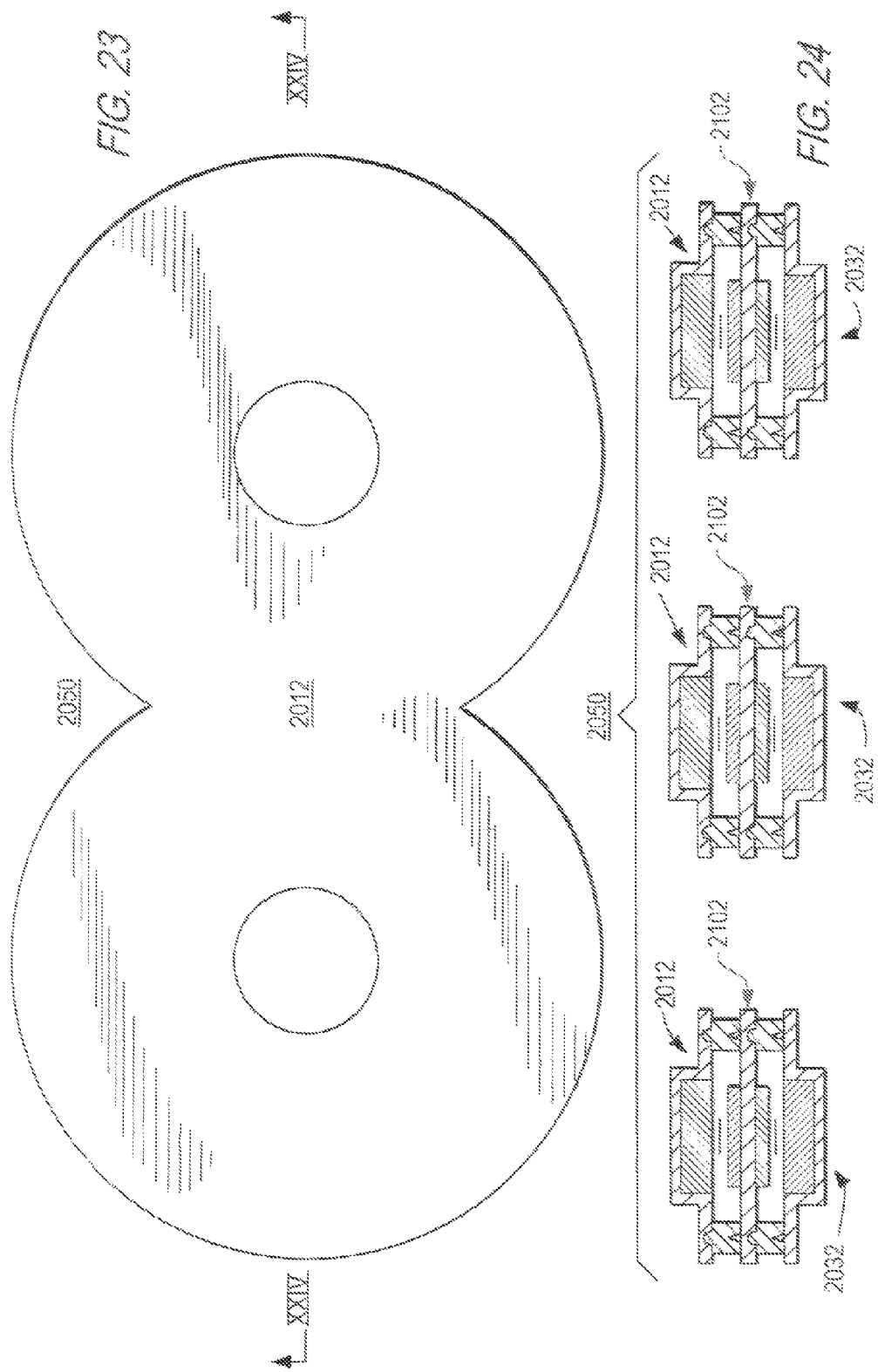

BI-POLAR RECHARGEABLE ELECTROCHEMICAL BATTERY

This application claims the benefit of U.S. Provisional Patent Application No. 60/677,512, filed May 3, 2005, which is hereby incorporated by reference herein in its entirety.

FIELD OF THE INVENTION

This invention relates generally to batteries and, more particularly, to bi-polar batteries with improved sealing.

BACKGROUND OF THE INVENTION

Bi-polar batteries are able to provide an increased discharge rate and a higher voltage potential between its external connectors than standard wound or prismatic batteries, and are therefore in high demand for certain applications. Conventional batteries have been manufactured as either a wound cell battery that has only two electrodes or a standard prismatic cell battery that has many plate sets in parallel. In both of these types, the electrolyte can be shared everywhere within the battery. The wound cell and prismatic cell structures suffer from high electrical resistances due to their electrical paths having to cross multiple connections and cover significantly long distances to cover the complete circuit from one cell to the next in a series arrangement.

Recently, bi-polar batteries have been developed to generally include a series of stacked bi-polar electrode units (BPUs), each BPU being provided with a positive active material electrode layer and a negative active material electrode layer coated on opposite sides of a current collector (see, for example, Fukuzawa et al. U.S. Patent Publication No. 2004/0161667 A1, published Aug. 19, 2004, which is hereby incorporated by reference herein in its entirety). Any two adjacent BPUs have an electrolyte layer therebetween for electrically isolating the current collectors of those two BPUs. The series configuration of a bi-polar battery causes the voltage potential to be different between current collectors. However, if the current collectors contacted each other or if the common electrolyte of any two adjacent BPUs is shared with any additional BPU, the voltage and energy of the battery would fade (i.e., discharge) quickly to zero.

Accordingly, it would be advantageous to be able to provide a bi-polar battery with improved sealing of electrolyte between adjacent BPUs.

SUMMARY OF THE INVENTION

It is therefore an object of this invention to provide a bi-polar battery with improved sealing of electrolyte between adjacent bi-polar electrode units.

In accordance with the invention, there is provided a bi-polar battery having a positive mono-polar electrode unit, a negative mono-polar electrode unit, at least one bi-polar electrode unit stacked between the positive electrode unit and the negative electrode unit, and an electrolyte layer provided between each pair of adjacent electrode units. The bi-polar battery also includes a gasket positioned about each of the electrolyte layers, wherein each of the electrolyte layers is sealed by its respective gasket and its respective pair of adjacent electrode units.

BRIEF DESCRIPTION OF THE DRAWINGS

The above and other advantages of the invention will be more apparent upon consideration of the following detailed description, taken in conjunction with the accompanying drawings, in which like reference characters refer to like parts throughout, and in which:

FIG. 23 is a schematic top view of a bi-polar battery according to an alternative embodiment of the invention; and FIG. 24 is a schematic cross-sectional view of the bi-polar battery of FIG. 23, taken from line XXIV-XXIV of FIG. 23.

DETAILED DESCRIPTION OF THE INVENTION

The invention provides a bi-polar battery having a positive mono-polar unit (MPU) terminal, a negative MPU terminal, and at least one bi-polar unit (BPU) arranged substantially vertically therebetween. Each BTU includes an electrode layer (e.g., a conductive substrate) having two sides. A positive active material is formed or positioned on the first side of the electrode layer, and a negative material is formed or positioned on the second side of the electrode layer. The bi-polar battery of this invention also includes an electrolyte layer having an electrolyte between each adjacent electrode unit (i.e., between each MPU and adjacent BPU, and between each BPU and adjacent BPU) and a barrier that electrically isolates the adjacent electrode units between which the electrolyte layer is positioned. Additionally, the bi-polar battery of this invention includes a gasket positioned substantially about each electrolyte layer for sealing the electrolyte of the electrolyte layer between the gasket and the two electrode layers adjacent thereto.

The invention will now be described with reference to FIGS. 1-24.

Figure 1:
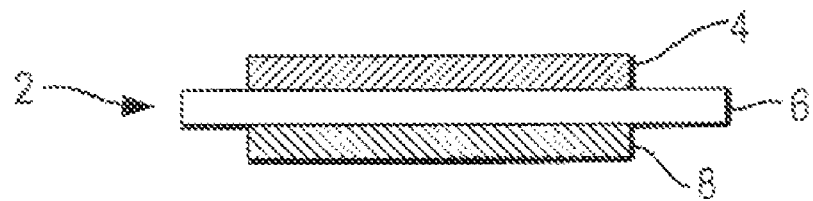
FIG. 1 is a schematic cross-sectional view of a basic structure of a bi-polar electrode unit (BPU) according to the invention.

FIG. 1 shows an illustrative BPU 2, in accordance with one embodiment of the present invention, including a positive active material electrode layer 4 provided on a first side of an impermeable conductive substrate 6, and a negative active material electrode layer 8 provided on the other side of the impermeable conductive substrate 6.

Figure 2:
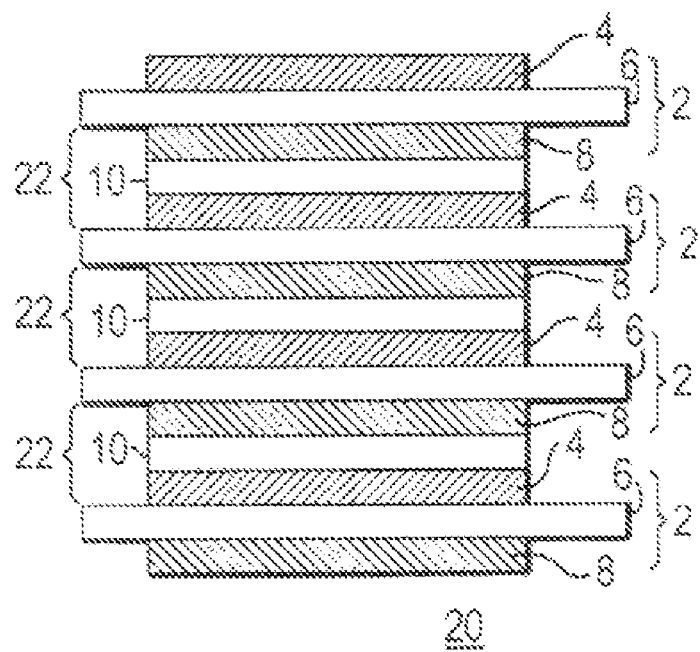
FIG. 2 is a schematic cross-sectional view of a basic structure of a stack of BPUs of FIG. 1 according to the invention.

As shown in FIG. 2, multiple BPUs 2 may be stacked substantially vertically into a stack 20, with an electrolyte layer 10 provided between two adjacent BPUs 2, such that a positive electrode layer 4 of one BPU 2 is opposed to a negative electrode layer 8 of an adjacent BPU 2 via an electrolyte layer 10. Each electrolyte layer 10 preferably includes a separator 9a-b that holds an electrolyte 11a-b (see, e.g., FIG. 6). Separator 9a-b may electrically separate the positive electrode layer 4 and negative electrode layer 8 adjacent thereto, while allowing ionic transfer between the electrode units for recombination, as described in more detail below.

With continued reference to the stacked state of BPUs 2 in FIG. 2, the components included in positive electrode layer 4 and substrate 6 of a first BPU 2, the negative electrode layer 8 and substrate 6 of a second BPU 2 adjacent to the first BPU 2, and the electrolyte layer 10 between the first and second BPUs 2 shall be referred to herein as a "cell segment" 22. Each impermeable substrate 6 of each cell segment 22 is shared by the applicable adjacent cell segment 22.

Figure 3:
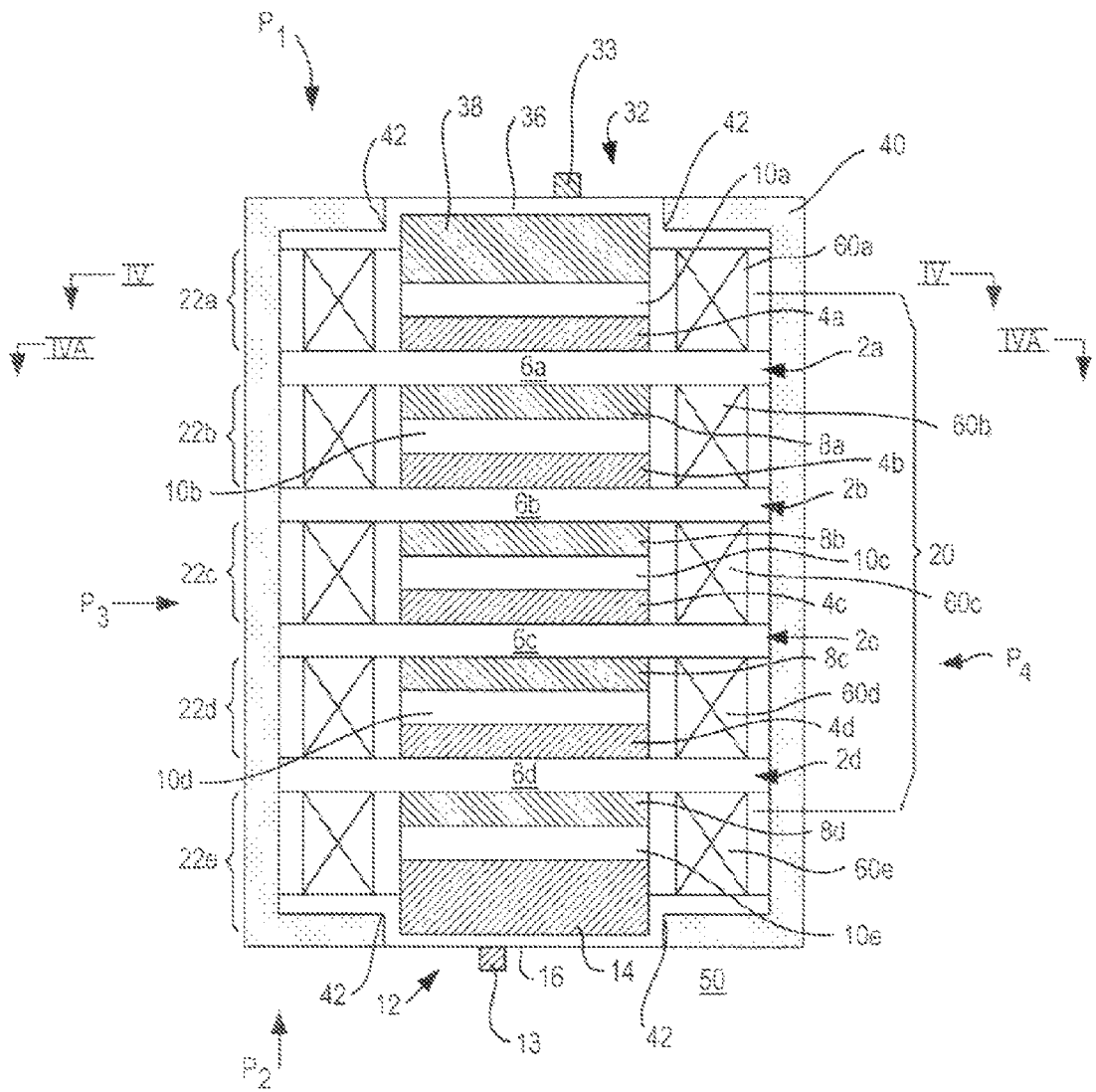
FIG. 3 is a schematic cross-sectional view of a basic structure of a bi-polar battery implementing the stack of BPUs of FIG. 2 according to the invention.
Figure 4:
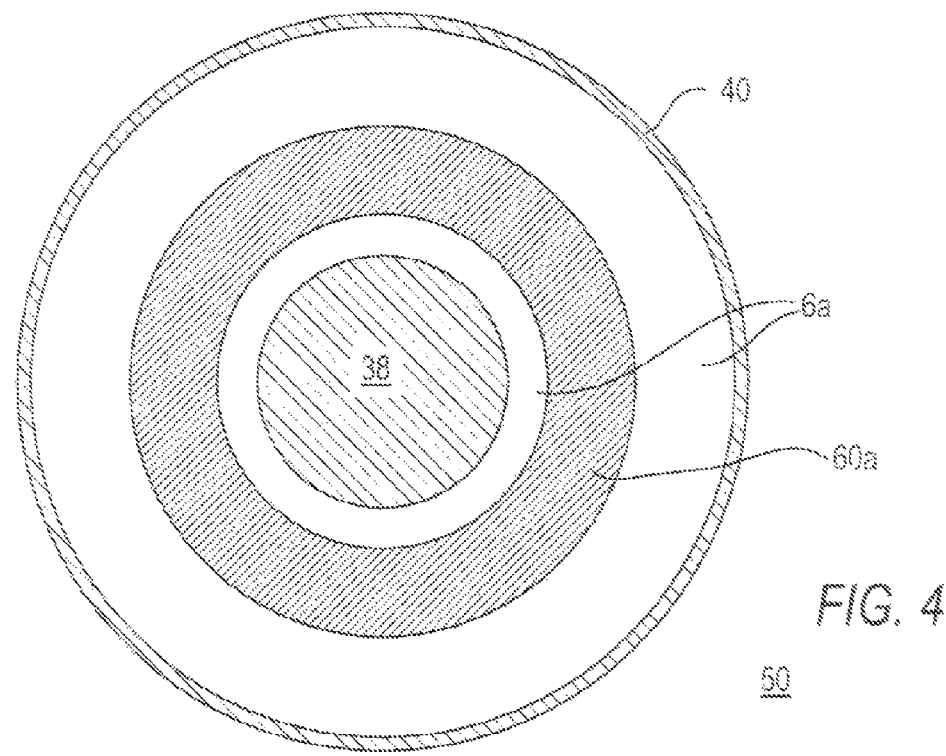
FIG. 4 is a schematic top view of the bi-polar battery of FIG. 3, taken from line IV-IV of FIG. 3.

As shown in FIGS. 3 and 4, positive and negative terminals may be provided along with stack 20 of one or more BPUs 2a-d to constitute a bi-polar battery 50 in accordance with one embodiment of the invention. A positive MPU 12, including a positive active material electrode layer 14 provided on one side of an impermeable conductive substrate 16, may be positioned at a first end of stack 20 with an electrolyte layer provided therebetween (i.e., electrolyte layer 10e), such that positive electrode layer 14 of positive MPU 12 is opposed to a negative electrode layer (i.e., layer 8d) of the BPU (i.e., BPU 2d) at that first end of stack 20 via the electrolyte layer 10e. A negative MPU 32, including a negative active material electrode layer 38 provided on one side of an impermeable conductive substrate 36, may be positioned at the second end of stack 20 with an electrolyte layer provided therebetween (i.e., electrolyte layer 10a), such that negative electrode layer 38 of negative MPU 32 is opposed to a positive electrode layer (i.e., layer 4a) of the BPU (i.e., BPU 2a) at that second end of stack 20 via the electrolyte layer 10a. If desired, MPUs 12 and 32 may be provided with corresponding positive and negative electrode leads 13 and 33, respectively.

It should be noted that the substrate and electrode layer of each MPU may form a cell segment 22a/22e with the substrate and electrode layer of its adjacent BPU 2a/2d, and the electrolyte layer 10a/10e therebetween, as shown in FIG. 3. The number of stacked BPUs 2a-d in stack 20 may be one or more, and is appropriately determined in order to correspond to a desired voltage for battery 50. Each BPU 2a-d may provide any desired potential, such that a desired voltage for battery 50 may be achieved by effectively adding the potentials provided by each component BPU 2a-d. It will be understood that each BPU 2a-d need not provide identical potentials.

In one suitable embodiment, bi-polar battery 50 is structured so that the whole of the BPU stack 20 and its respective positive and negative MPUs 12 and 32 is encapsulated (e.g., hermetically sealed) into a battery case or wrapper 40 under reduced pressure. MPU conductive substrates 6 and 36 (or at least their respective electrode leads 13 and 33) may be drawn out of battery case 40, so as to mitigate impacts from the exterior upon usage and to prevent environmental degradation. Indentations 42 may be provided in MPUs 12 and 32 for a low-profile casing and a flat surface.

Figure 4A:
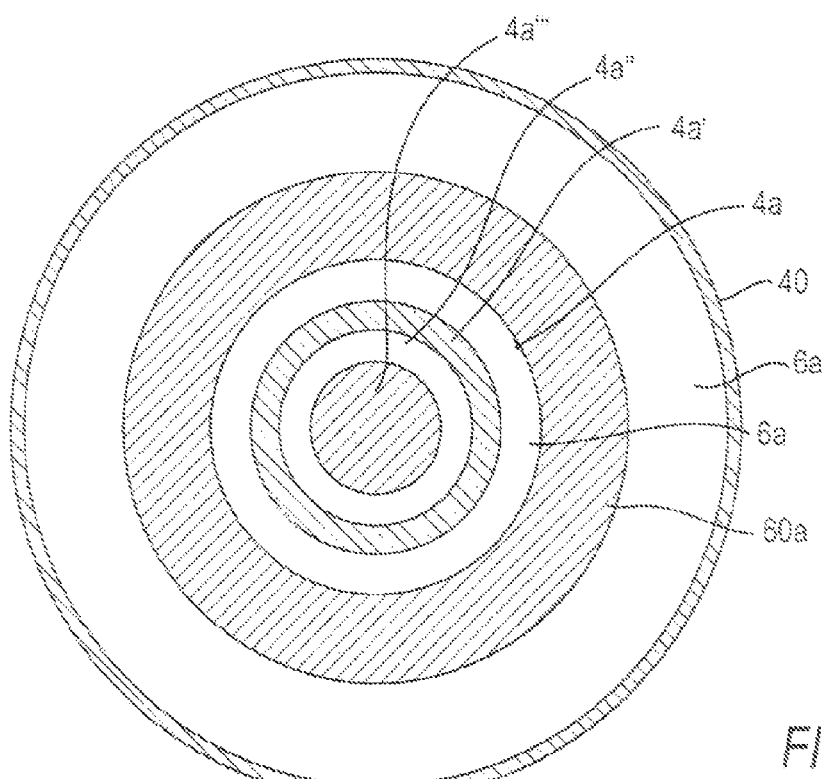
FIG. 4A is a schematic top view of the bi-polar battery of FIG. 3, taken from line IVA-IVA of FIG. 3.

In order to prevent electrolyte of a first cell segment (see, e.g., electrolyte 11a of cell segment 22a of FIG. 6A) from combining with the electrolyte of another cell segment (see, e.g., electrolyte 11b of cell segment 22b of FIG. 6A), gaskets are preferably stacked with electrolyte layers 10a-e between adjacent electrode units to seal electrolyte within its particular cell segment 22a-e. In one suitable arrangement, as shown in FIGS. 3-4A, the bi-polar battery of the invention may include gaskets 60a-e positioned as a continuous loop about electrolyte layers 10a-e and active material electrode layers 4a-d, 8a-d, 14, and 38 of each cell segment 22a-e for sealing electrolyte between the gasket and the electrode units of that segment (i.e., the BPUs or the BPU and MPU adjacent to that gasket) and for keeping the appropriate gaps between the adjacent conductive substrates 6a-d/16/32 of that segment.

Figure 5:
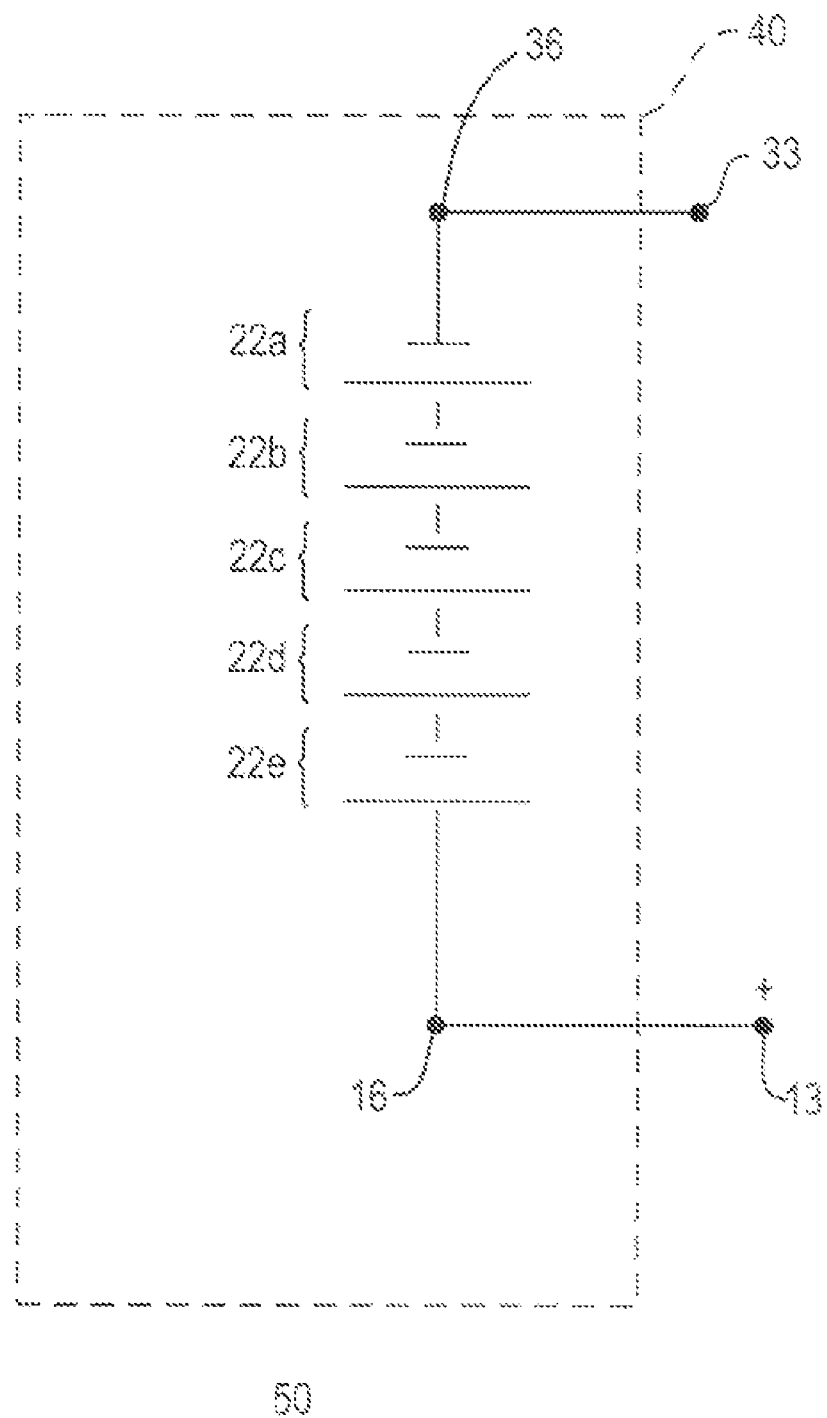
FIG. 5 is a schematic circuit diagram of the basic constitution of the bi-polar battery of FIGS. 3-4A.

As will be described in more detail below, in one suitable approach, pressure may be applied to the top and bottom of case 40 in the direction of arrows P1 and P2 for compressing and holding cell segments 22a-e and gaskets 60a-e in the sealed configuration shown in FIGS. 3-4A. In another suitable approach, pressure may be applied to the sides of case 40 in the direction of arrows P3 and P4 for compressing and holding cell segments 22a-e and gaskets 60a-e in the sealed configuration shown in FIGS. 3-4A. In yet another suitable approach, pressure may be applied to the top and bottom of case 40 in the direction of arrows P1 and P2 and pressure may be also applied to the sides of case 40 in the direction of arrows P3 and P4 for compressing and holding cell segments 22a-e and gaskets 60a-e in the sealed configuration shown in FIGS. 3-4A. Such a bi-polar battery 50 may include multiple cell segments 22a-e stacked and series-connected, as shown in FIG. 5, to provide the desired voltage.

Figure 6:
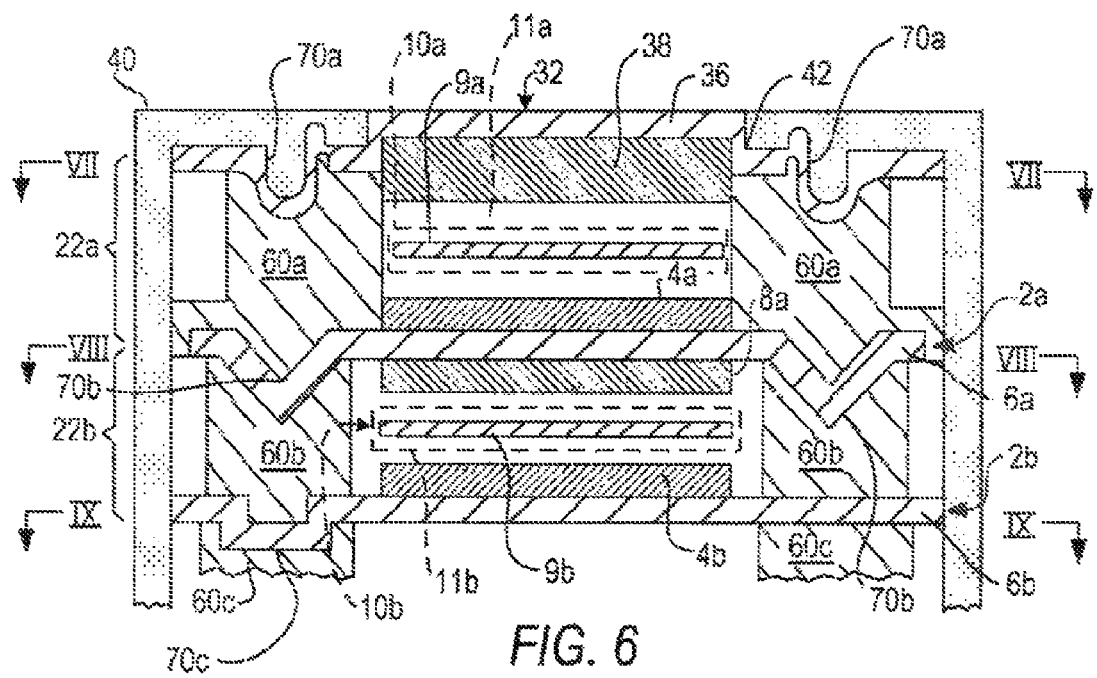
FIG. 6 is a detailed schematic cross-sectional view of a particular portion of the bi-polar battery of FIGS. 3-5.

Referring now to FIG. 6, there is shown an exploded view of two particular cell segments 22a-b of battery 50 of the invention. Cell segment 22a includes substrate 36 and negative electrode layer 38 of MPU 32, electrolyte layer 10a, as well as positive electrode layer 4a and substrate 6a of BPU 2a. Cell segment 22b includes substrate 6a and negative electrode layer 8a of BPU 2a, electrolyte layer 10b, as well as positive electrode layer 4b and substrate 6b of BPU 2b. As described above, each electrolyte layer 10a-e may include a separator 9a-b and an electrolyte 11a-b. A gasket 60a-e may be provided as a continuous loop about electrolyte layer 10a-e of each cell segment 22a-e such that separator 9a-b and electrolyte 11a-b of that segment are completely sealed within the space defined by gasket 60a-e and the adjacent substrates of that particular cell segment.

Figure 7:
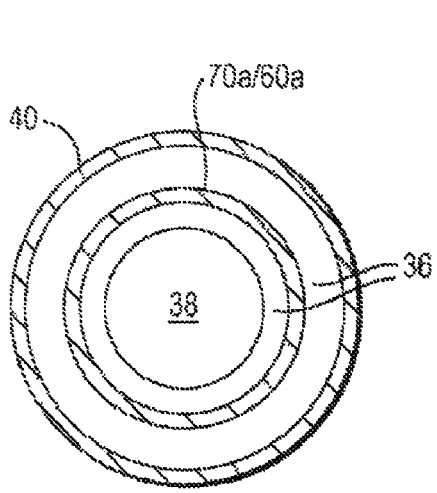
FIG. 7 is a schematic top view of the bi-polar battery of FIGS. 3-6, taken from line VII-VII of FIG. 6.
Figure 8:
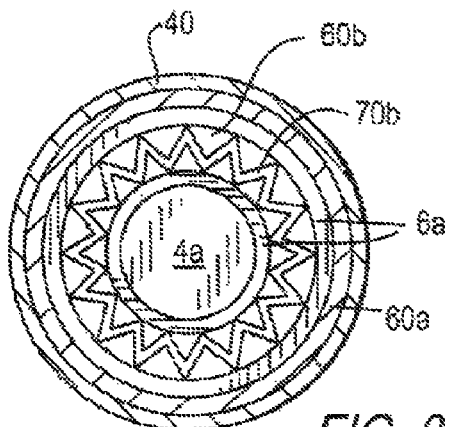
FIG. 8 is a schematic top view of the bi-polar battery of FIGS. 3-7, taken from line VIII-VIII of FIG. 6.
Figure 9:
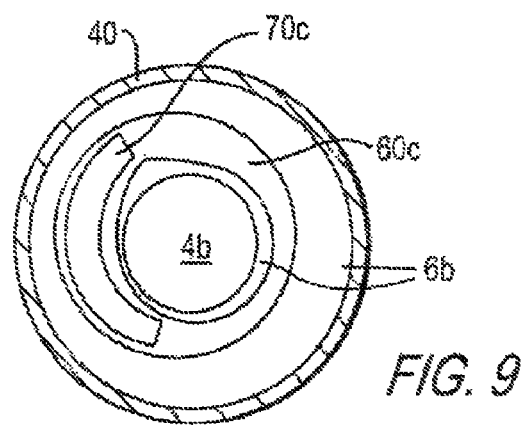
FIG. 9 is a schematic top view of the bi-polar battery of FIGS. 3-8, taken from line IX-IX of FIG. 6.
Figure 10:
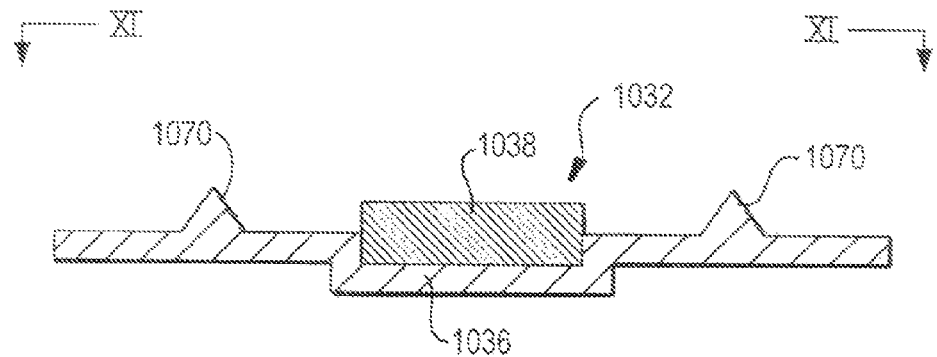
FIG. 10 is a schematic cross-sectional view of certain elements in a first stage of a method for forming a bi-polar battery according to a preferred embodiment of the invention.
Figure 11:
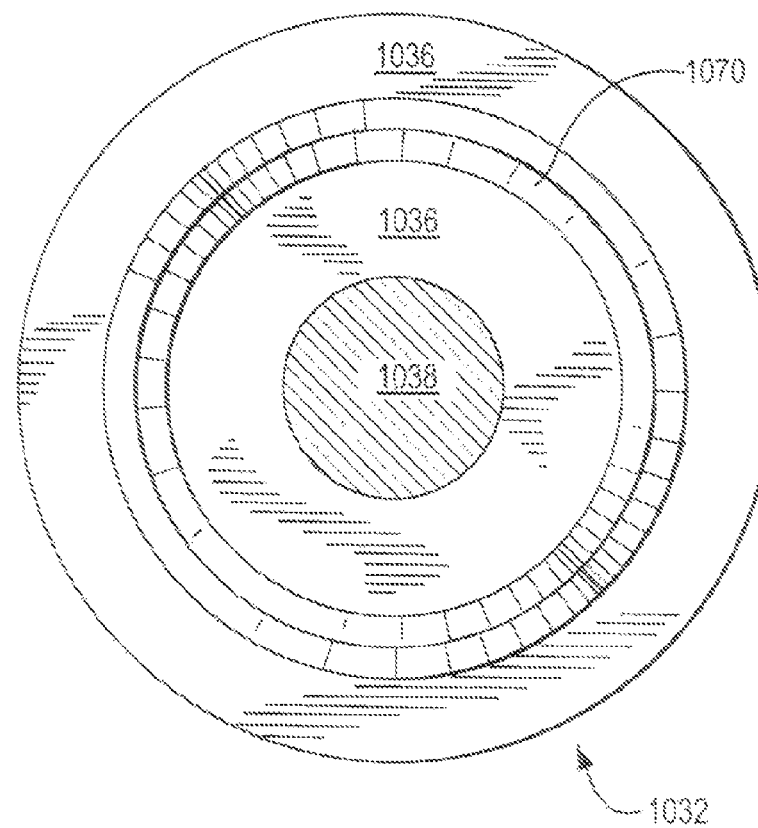
FIG. 11 is a schematic top view of the elements of FIG. 10, taken from line XI-XI of FIG. 10.

As shown in FIGS. 6 and 7, gasket 60a surrounds electrolyte layer 10a such that its separator 9a and electrolyte 11a are completely sealed within the space defined by gasket 60a, substrate 36, and substrate 6a of cell segment 22a. Likewise, as shown in FIGS. 6 and 8, gasket 60b surrounds electrolyte layer 10b such that its separator 9b and electrolyte 11b are completely sealed within the space defined by gasket 60b, substrate 6a, and substrate 6b of cell segment 22b. Furthermore, each gasket may form a seal with the active material layers of its cell segment by contacting their sides (see, e.g., gasket 60a and the sides of active material layers 38 and 4a).

In one suitable embodiment, in order to create a better seal, the surface areas of the gasket and its adjacent substrates that contact each other may be chamfered. As shown in FIGS. 6-9, grooves 70a-c may be formed along the surface areas of the gaskets and the substrates at their point of contact with one another, thereby increasing the size of the contact area and creating a path of greater resistance for any fluid attempting to break the seal created between the gasket and substrate. The cross-sectional area of the grooves between the surfaces of the gasket and the particular substrate may be of any suitable shape, such as sinusoidal (see, e.g., groove 70a in FIG. 6), V-shaped (see, e.g., groove 70b in FIG. 6), or rectangular (see, e.g., groove 70c in FIG. 6), for example. Furthermore, the path of grooves 70a-c about the particular substrate of its cell segment may be of any suitable design, such as smooth and continuous (see, e.g., groove 70a in FIG. 7), jagged and continuous (see, e.g., groove 70b in FIG. 8), or non-continuous (see, e.g., groove 70c of FIG. 9), for example. The shapes and sizes of the grooves provided between gaskets and substrates described herein are only exemplary, and any various sizes and shapes may be used to create such grooves. Furthermore, no groove may be provided between the gaskets and substrates in accordance with certain embodiments of the present invention.

The substrates used to form the electrode units of the invention (e.g., substrates 6a-d, 16, and 36) may be formed of any suitable conductive and impermeable material, such as a non-perforated metal foil. The substrate of each BPU may typically be between 1 and 5 millimeters thick, while the substrate of each MPU may be between 5 and 10 millimeters thick and act as terminals to the battery, for example. Each substrate may be made of aluminum foil, stainless steel foil, cladding material comprising nickel and aluminum, cladding material comprising copper and aluminum, nickel plated steel, nickel plated copper, nickel plated aluminum, gold, silver, or any suitable combination thereof, for example. Each substrate may be made of two or more sheets of metal foils adhered to one another, in certain embodiments.

The positive electrode layers provided on these substrates to form the electrode units of the invention (e.g., positive electrode layers 4a-d and 14) may be formed of any suitable active material, such as nickel hydroxide ($Ni(OH)_2$), for example. The positive active material may be sintered and impregnated, coated with an aqueous binder and pressed, coated with an organic binder and pressed, or contained by any other suitable method of containing $Ni(OH)_2$ with other supporting chemicals in a conductive matrix. The positive electrode layer of the electrode unit may have metal hydride (MH) particles infused within the $Ni(OH)_2$ matrix to reduce swelling, which increases cycle life, to improve recombination, and to reduce pressure within the cell segment. The MH may also be in a bonding of $Ni(OH)_2$ paste to improve electrical conductivity within the electrode and to support recombination. Other chemicals could be substituted for MH, such as Pd or Ag, for example.

The negative electrode layers provided on these substrates to form the electrode units of the invention (e.g., negative electrode layers 8a-d and 38) may be formed of any suitable active material, such as metal hydride (MH), Cd, Zn, and Ag, for example. The negative active material may be sintered, coated with an aqueous binder and pressed, coated with an organic binder and pressed, or contained by any other suitable method of containing MH with other supporting chemicals in a conductive matrix. The MH electrode side may have $Ni(OH)_2$ infused within the MH matrix to stabilize the structure, reduce oxidation, and extend cycle life. Other chemicals could be substituted for $Ni(OH)_2$, such as Zn or Al, for example.

Various suitable binders, such as organic CMC binder, Creyton rubber, and PTFE (Teflon), for example, may be mixed with the active material layers to hold the layers to their substrates.

The separator 9a-b of each electrolyte layer 10a-e of the bi-polar battery of the invention may be formed of any suitable material that electrically isolates its two adjacent electrode units while allowing ionic transfer between those electrode units. The separator may contain cellulose super absorbers to improve filling and act as an electrolyte reservoir to increase cycle life, wherein the separator may be made of a polyabsorb diaper material, for example, whereby the separator could preferably release previously absorbed electrolyte when charge is applied to the battery. In certain embodiments, the separator may be of a lower density and thicker than normal cells so that the Inter-Electrode-Spacing (IES) can start higher than normal and be continually reduced to maintain the C-rate and capacity of the battery over its life as well as to extend the life of the battery.

The separator may be a thinner than normal material bonded to the surface of the active material on the electrode units to reduce shorting and improve recombination. This separator material could be sprayed on, coated on, or pressed on, for example. The separator may have a recombination agent attached thereto, in certain embodiments. This agent could be infused within the structure of the separator (this could be done by physically trapping the agent in a wet process using a PVA to bind the agent to the separator fibers, or the agent could be put therein by electro-deposition, for example), or it could be layered on the surface by vapor deposition. The material could be Pb, Ag, or any other agent that effectively supports recombination. While the separator preferably presents a resistance if the substrates move toward each other, a separator may not be provided in certain embodiments of the invention that utilize substrates that are stiff enough not to deflect.

The electrolyte 11a-b of each electrolyte layer 10a-e of the bi-polar battery of the invention may be formed of any suitable chemical compound that ionizes when dissolved or molten to produce an electrically conductive medium. The electrolyte is preferably a standard NiMH electrolyte containing lithium hydroxide (LiOH), sodium hydroxide (NaOH), calcium hydroxide (CaOH), or potassium hydroxide (KOH), for example. The electrolyte may also contain additives to improve recombination, such as $Ag(OH)_2$, for example. The electrolyte may also contain RbOH, for example, to improve low temperature performance. In some embodiments of the invention, the electrolyte (e.g., electrolyte 11a) may be frozen within the separator (e.g., separator 9a) and then thawed after the battery is completely assembled. This allows for particularly viscous electrolytes to be inserted into the electrode unit stack of the bi-polar battery before the gaskets have formed substantially fluid tight seals with the substrates adjacent thereto.

The gaskets 60a-e of the bi-polar battery of the invention may be formed of any suitable material or combination of materials that may effectively seal an electrolyte within the space defined by the gasket and the substrates adjacent thereto. In certain embodiments, the gasket could be formed from a solid seal loop, such as nylon, polypropylene, cell gard, rubber, PVA, or any other nonconductive material, or combination thereof, for example. This seal ring may be compressible to improve sealing. The compression may preferably be about 5%, but may be whatever elasticity is needed to insure a good seal.

Alternatively, the gaskets may be formed from a viscous paste, such as epoxy, brea tar, or KOH impervious glue, for example. In yet other embodiments, the gaskets utilized in the bi-polar battery of this invention may be formed by a combination of a solid seal loop and a viscous paste used to improve sealing between the gasket and the electrode unit substrates adjacent thereto. Alternatively, the substrates themselves could be treated with viscous pastes before the gaskets are stacked therebetween.

As mentioned above, one benefit of utilizing a bi-polar battery design is the increased discharge rate of the battery. This increased discharge rate allows for the use of certain less-corrosive electrolytes (e.g., by removing or reducing the KOH component of the electrolyte) that otherwise might not be feasible in prismatic or wound battery designs. This leeway provided by the bi-polar design to use less-corrosive electrolytes allows for certain epoxies (e.g., J-B Weld epoxy, for example, which has no KOH electrolytes) to be utilized when forming a seal with the gaskets that otherwise would be corroded by more-corrosive electrolytes.

As described above, the top and bottom of each gasket may be chamfered to fit against a reciprocal groove in its adjacent substrate. Furthermore, each gasket may be shaped at its external edge such that it fits over the outside edge of its adjacent substrate when placed in the stack (see, e.g., gasket 60a with respect to substrate 6a in FIGS. 6 and 8).

The case or wrapper 40 of the bi-polar battery of the invention may be formed of any suitable nonconductive material that seals to the terminal electrode units (i.e., MPUs 12 and 32) for exposing their conductive electrode layers (i.e., layers 4a-d and 38) or their associated leads (i.e., leads 13 and 33). The wrapper also preferably supports and maintains the seals between the gaskets and the electrode unit substrates adjacent thereto for isolating the electrolytes within their respective cell segments. The wrapper preferably gives the support required to these seals such that they may resist expansion of the battery as the internal pressures in the cell segments increase. The wrapper may be made of nylon or any other polymer or elastic material, including reinforced composites, or shrink wrap material, or of a ridged material, such as enamel coated steel or any other metal, for example.

With continued reference to FIG. 3, bi-polar battery 50 of the invention includes a plurality of cell segments (e.g., cell segments 22a-22e) formed by MPUs 12 and 32, and the stack of BPUs (e.g., BPUs 2a-2d) therebetween. In accordance with certain embodiments of the invention, the thicknesses and materials of each one of the substrates (e.g., substrates 6a-6d), the electrode layers (e.g., positive layers 4a-d and 14, and negative layers 8a-8d and 38), the electrolyte layers (e.g., layers 10a-10e), and the gaskets (e.g., gaskets 60a-60e) may differ from one another, not only from cell segment to cell segment, but also within a particular cell segment, thereby creating batteries with a plethora of different benefits and performance characteristics.

For example, substrate 6a of BPU 2a may be coated with a variety of active materials along different portions thereof for forming positive active material electrode layer 4a, as shown, for example, in FIG. 4A by outermost portion 4a', middle portion 4a'', and innermost portion 4a'''. Each one of portions 4a'-4a''' may be formed by a different active material and/or may be of a different thickness, for example.

Additionally, besides varying the materials and thicknesses within a particular substrate, electrode layer, electrolyte layer, or gasket, as described above with respect to substrate 6a in FIG. 4A, the materials and thicknesses of the substrates, electrode layers, electrolyte layers, and gaskets can vary along the height of the stack of cell segments. As an example, the electrolyte used in each of the electrolyte layers of battery 50 may vary based upon how close its respective cell segment is to the middle of the stack of cell segments. For example, cell segment 22c (i.e., the middle cell segment of the five (5) segments in battery 50) may include an electrolyte layer (i.e., electrolyte layer 10c) that is formed of a first electrolyte, while cell segments 22b and 22d (i.e., the cell segments adjacent the terminal cell segments in battery 50) may include electrolyte layers (i.e., electrolyte layers 10b and 10d, respectively) that are each formed of a second electrolyte, while cell segments 22a and 22e (i.e., the outermost cell segments in battery 50) may include electrolyte layers (i.e., electrolyte layers 10a and 10e, respectively) that are each formed of a third electrolyte. By using higher conductivity electrolytes in the internal stacks, the resistance would be lower such that the heat generated would be less, thereby providing the thermal control of the battery by design instead of by external cooling methods.

As mentioned above, a method of producing the bi-polar battery of this invention may generally include the steps of providing an MPU and stacking one or more BPUs thereon with electrolyte layers and gaskets therebetween, before finally topping off the stack with another MPU of opposite polarity. For example, with respect to FIGS. 10 and 11, a negative MPU 1032 may initially be provided with an impermeable conductive substrate 1036 and a negative active material electrode layer 1038 coated thereon. Substrate 1036 is preferably provided with a groove 1070 at least partially about negative layer 1038.

Figure 12:
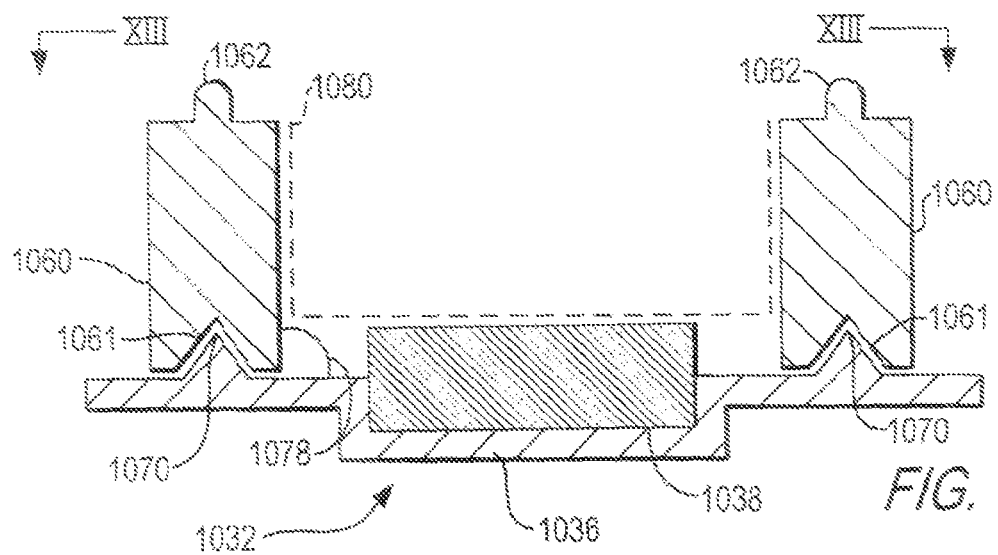
FIG. 12 is a schematic cross-sectional view of certain elements in a second stage of a method for forming a bi-polar battery according to a preferred embodiment of the invention.
Figure 13:
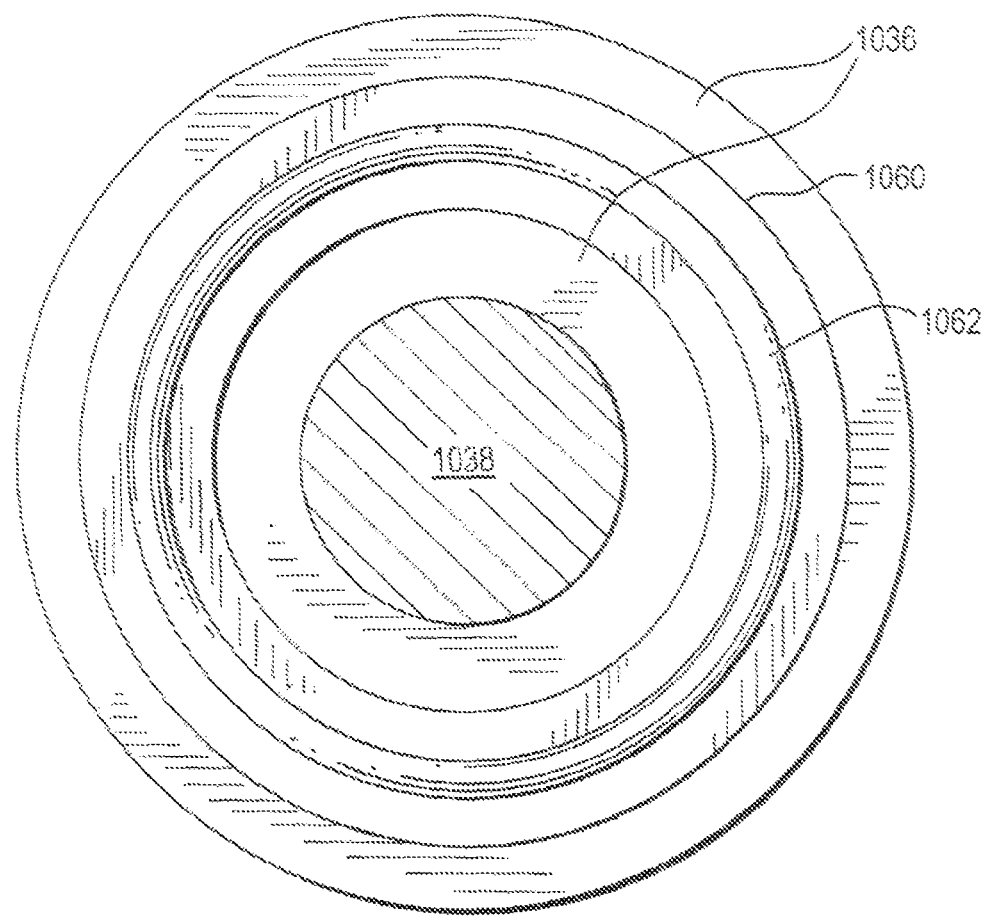
FIG. 13 is a schematic top view of the elements of FIG. 12, taken from line XIII-XIII of FIG. 12.

Next, a gasket 1060 is preferably stacked upon substrate 1036 about electrode layer 1038 (see, e.g., FIGS. 12 and 13). A groove 1061 is preferably chamfered into the side of gasket 1060 that contacts substrate 1036, such that grooves 1070 and 1061 align to create a continuous contact surface area between the gasket and the substrate. These reciprocal grooves aid in the self-alignment of the gasket with respect to the MPU as it is stacked thereupon, thereby simplifying this production step. Once gasket 1060 has been stacked firmly on top of MPU 1032, a substantially fluid tight cup-shaped receptacle (see, e.g., space 1080) is thus defined by the inner side walls of gasket 1060 and the portions of MPU 1032 therebetween. The angle formed between the inner side walls of the gasket and the portions of the electrode unit therebetween (e.g., angle 1078 between the inner side walls of gasket 1060 and the portions of MPU 1032 therebetween in FIG. 13) may be of any suitable angle, including right angles, obtuse angles, or acute angles.

Figure 14:
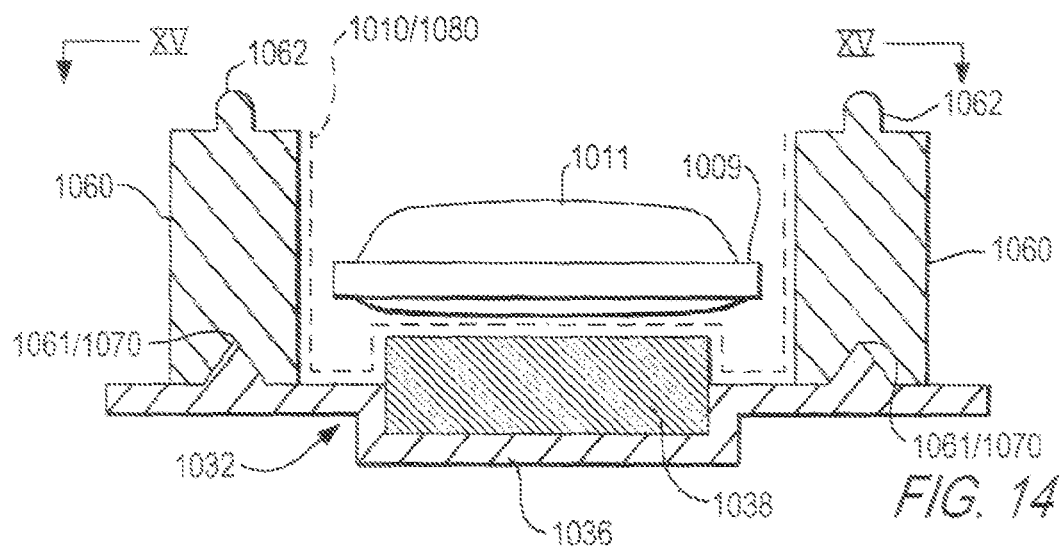
FIG. 14 is a schematic cross-sectional view of certain elements in a third stage of a method for forming a bi-polar battery according to a preferred embodiment of the invention.
Figure 15:
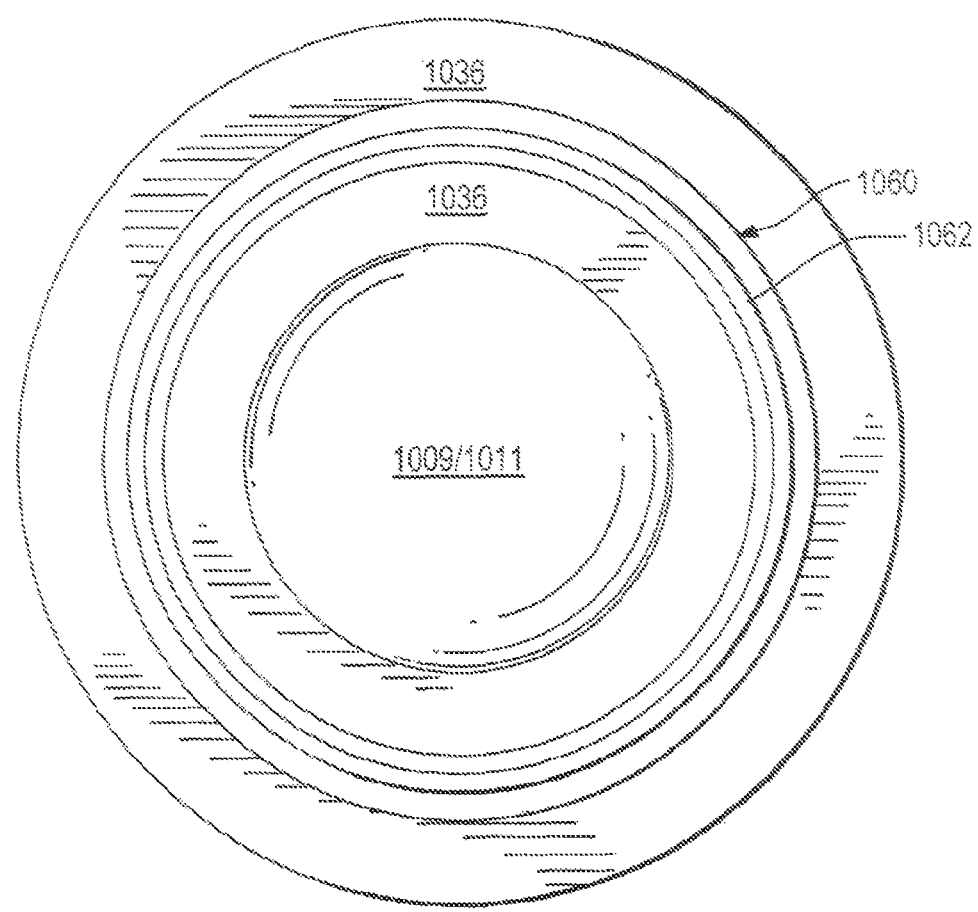
FIG. 15 is a schematic top view of the elements of FIG. 14, taken from line XV-XV of FIG. 14.

Next, a separator 1009 and an electrolyte 1011 may be deposited within the inner walls of gasket 1060 on top of negative electrode layer 1038 to define an electrolyte layer 1010 within the space 1080 (see, e.g., FIGS. 14 and 15). When the electrolyte to be used is quite viscous, the seal created between the gasket and the MPU allows for the electrolyte to be easily injected into space 1080 without chance of leaking. It is to be understood that if the electrolyte is not viscous upon insertion into the stack (e.g., in the embodiment where the electrolyte is frozen within the separator), the electrolyte layer may be stacked upon the MPU before the gasket is fitted thereon.

Figure 16:
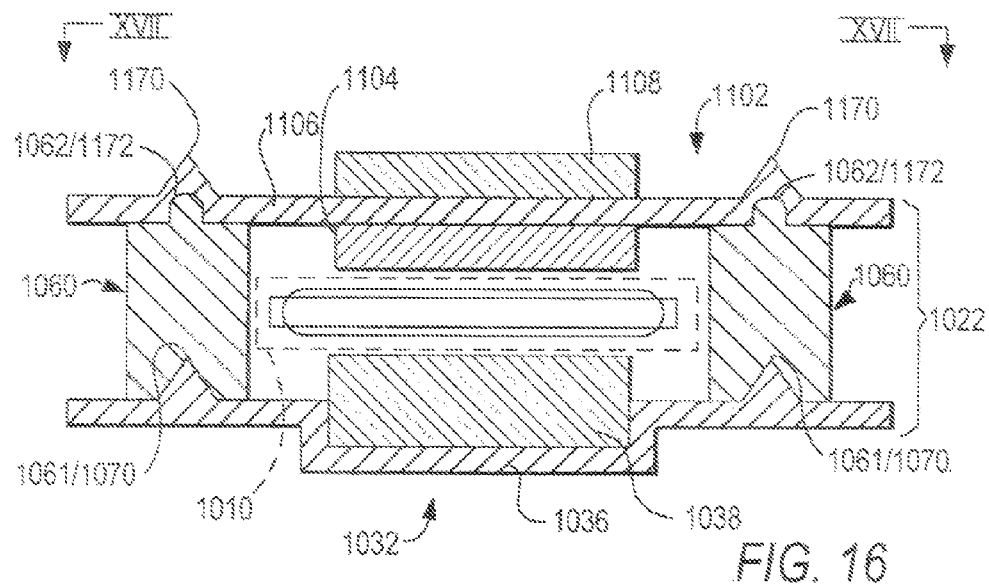
FIG. 16 is a schematic cross-sectional view of certain elements in a fourth stage of a method for forming a bi-polar battery according to a preferred embodiment of the invention.
Figure 17:
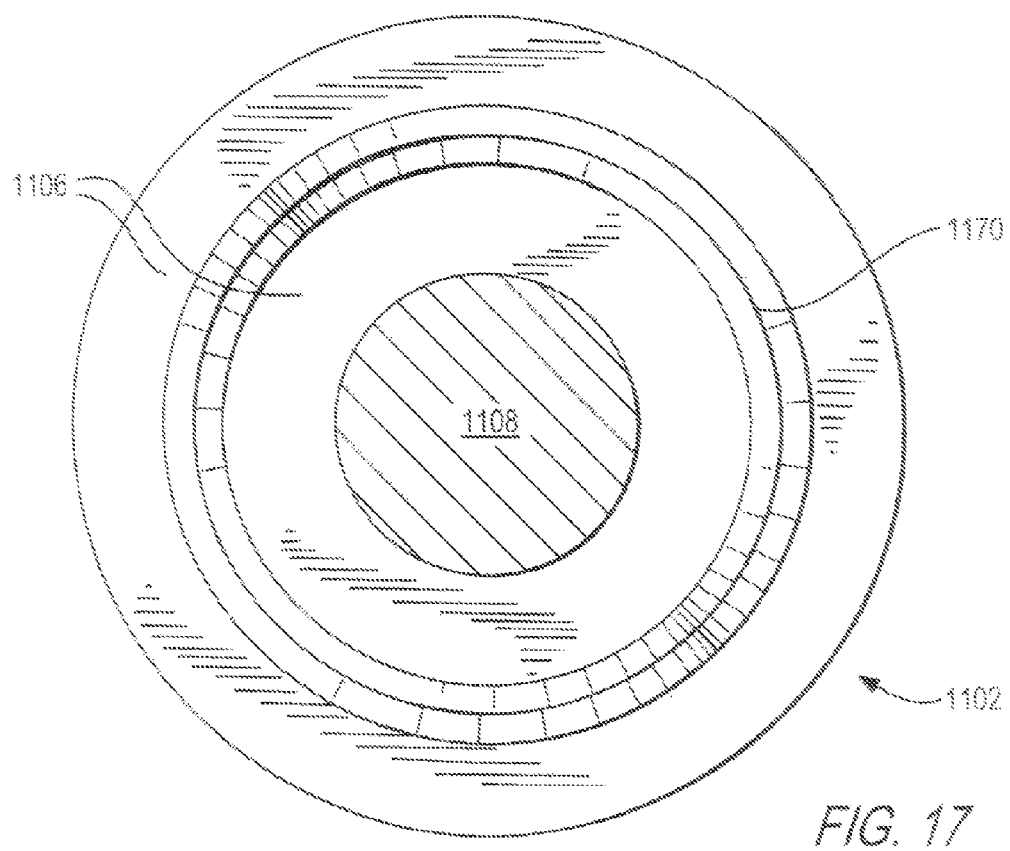
FIG. 17 is a schematic top view of the elements of FIG. 16, taken from line XVII-XVII of FIG. 16.

Once separator 1009 and electrolyte 1011 of electrolyte layer 1010 have been deposited within space 1080 defined by gasket 1060 and MPU 1032, a first BPU 1102 may be stacked thereupon (see, e.g., FIGS. 16 and 17). As shown in FIG. 16, BPU 1102 includes an impermeable conductive substrate 1106 having a positive electrode layer 1104 and a negative electrode layer 1108 coated on opposite sides thereof. Substrate 1106 is preferably provided with a groove 1172 on one of its sides at least partially about positive electrode layer 1104. With positive electrode layer 1104 of BPU 1102 facing downwards towards negative electrode layer 1038 of MPU 1032, BPU 1102 is stacked upon gasket 1060, such that groove 1062 provided on the top of gasket 1060 and groove 1172 of substrate 1106 align and create a continuous contact surface area between the gasket and the substrate. These reciprocal grooves aid in the self-alignment of the BPU with respect to the gasket, and therefore the MPU as it is stacked thereupon, thereby simplifying this production step. Once BPU 1102 has been stacked firmly on top of gasket 1060, and thus MPU 1032, a first cell segment 1022 exists. Moreover, a substantially fluid tight seal is thereby defined by substrate 1106, substrate 1036, and gasket 1060 about electrolyte layer 1010 (and thus electrolyte 1011).

It should be noted that, while groove 1062 on the top of gasket 1060 (and thus groove 1172 on the bottom of substrate 1106) may be of the same size, shape, and form (both cross-sectionally and about the electrodes) as that of groove 1061 on the bottom of gasket 1060, the grooves on the top and bottom of the gasket may be different from one another, as shown in FIG. 16, for example. Similarly, the grooves provided on the top and bottom of each substrate of the electrode units may vary with respect to one another (see, e.g., grooves 1172 and 1170 of BPU 1102 in FIG. 16).

Figure 18:
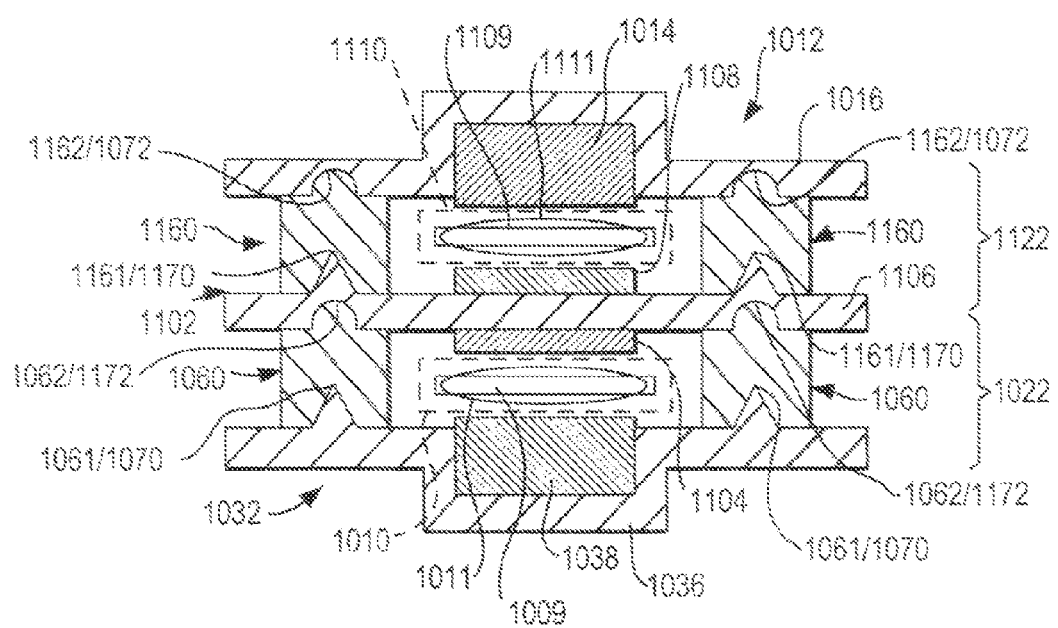
FIG. 18 is a schematic cross-sectional view of certain elements in a fifth stage of a method for forming a bi-polar battery according to a preferred embodiment of the invention.

Once this first cell segment 1022 has been created by stacking gasket 1060, electrolyte layer 1010, and BPU 1102 on top of MPU 1032, as described above with respect to FIGS. 10-17, additional BPUs may be stacked thereon in a similar fashion, if desired. Once the desired amount of BPUs has been stacked for the bi-polar battery, a second MPU must be stacked thereon. With reference to FIG. 18, a positive MPU 1012 may be stacked on top of the top most BPU (in this embodiment, only one BPU has been provided, so BPU 1102 is that top most BPU). However, before MPU 1012 is stacked upon BPU 1102, an additional gasket (i.e., gasket 1160 with bottom groove 1161 and top groove 1162) and electrolyte layer (i.e., electrolyte layer 1110 with separator 1109 and electrolyte 1111) may be provided as described above with respect to gasket 1060 and electrolyte layer 1010.

Positive MPU 1012 is preferably provided with an impermeable conductive substrate 1016 and a positive active material electrode layer 1014 coated thereon. Substrate 1016 is preferably provided with a groove 1072 at least partially about positive layer 1014. With positive electrode layer 1014 of MPU 1012 facing downwards towards negative electrode layer 1108 of BPU 1102, MPU 1012 is stacked upon gasket 1160, such that groove 1162 provided on the top of gasket 1160 and groove 1072 of substrate 1016 align and create a continuous contact surface area between the gasket and the substrate. These reciprocal grooves aid in the self-alignment of positive MPU 1012 with respect to gasket 1160, and therefore BPU 1102, and therefore gasket 1060, and therefore negative MPU 1032 as it is stacked thereupon. This self-aligning feature of the bi-polar battery of the invention significantly simplifies this production step. Once MPU 1012 has been stacked firmly on top of gasket 1160, and thus BPU 1102, a second cell segment (i.e., segment 1122) exists. Moreover, a substantially fluid tight seal is thereby defined by substrate 1016, substrate 1106, and gasket 1160 about electrolyte layer 1110 (and thus electrolyte 1111).

Figure 19:
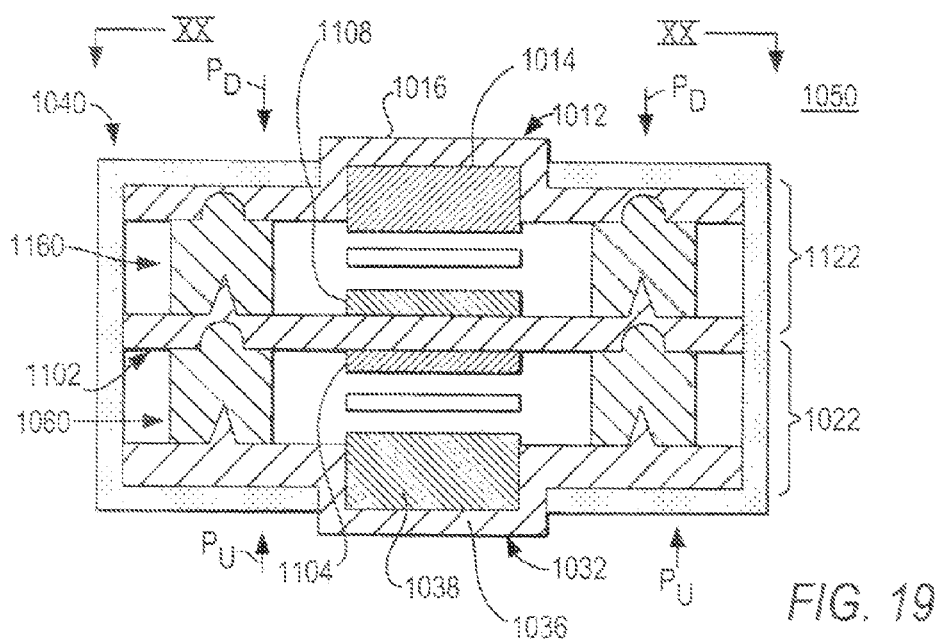
FIG. 19 is a schematic cross-sectional view of certain elements in a sixth stage of a method for forming a bi-polar battery according to a preferred embodiment of the invention.
Figure 20:
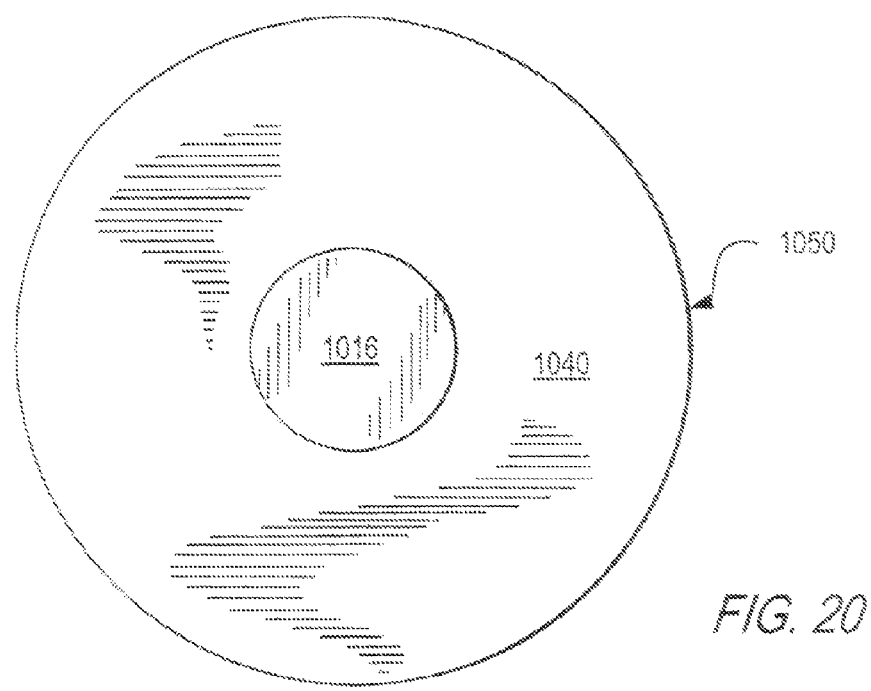
FIG. 20 is a schematic top view of the elements of FIG. 19, taken from line XX-XX of FIG. 19.

Once a stack is manufactured to include a positive MPU, a negative MPU, at least one BPU therebetween, and a gasket and electrolyte layer between each of the electrode units, thereby forming a stack of cell segments, as described above with respect to FIGS. 10-18, a case or wrapper may be provided to seal the contents of the stack for forming a functional bi-polar battery of the invention. In a first embodiment, as shown in FIGS. 19 and 20, a preferably rigid wrapper 1040 is provided about the stack of cell segments (i.e., cell segments 1022 and 1122), such that the terminal electrode layers (i.e., positive electrode layer 1014 and negative electrode layer 1038) are exposed (via conductive substrates 1016 and 1036, respectively), and such that a C-shaped clamping arrangement is provided by the wrapper about the contents of the stack to provide a bi-polar battery 1050. Pressure is exerted by the wrapper both downward onto substrate 1016 of MPU 1012 in the direction of arrows $P_D$ as well as upward onto substrate 1036 of MPU 1032 in the direction of arrows $P_U$. This pressure preferably maintains the sealed relationship between each gasket and the substrates adjacent thereto in the stack for creating substantially fluid tight barriers about each electrolyte layer. It should be noted that the mating of grooves formed in the gaskets and their adjacent substrates, as described above in accordance with certain embodiments of the invention, decreases the amount of clamping pressure required to be exerted in the direction of arrows $P_D$ and $P_U$ in order to create the substantially fluid tight seals.

Figure 21:
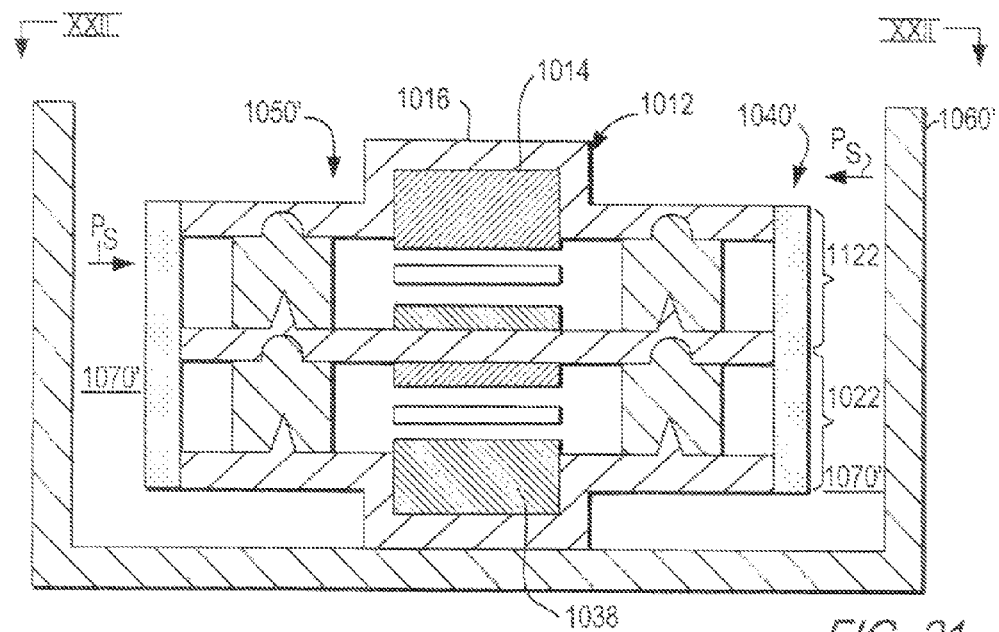
FIG. 21 is a schematic cross-sectional view of certain elements in a sixth stage of a method for forming a bi-polar battery according to an alternative embodiment of the invention.
Figure 22:
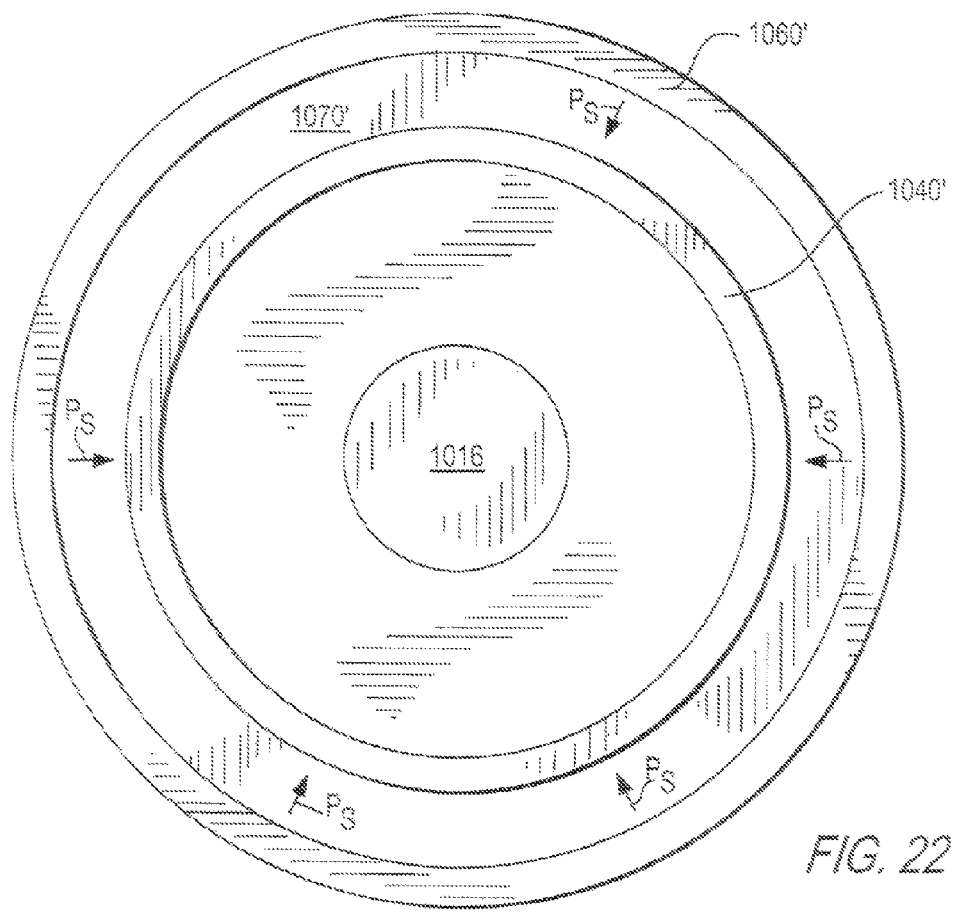
FIG. 22 is a schematic top view of the elements of FIG. 21, taken from line XXII-XXII of FIG. 21.

In another embodiment, as shown in FIGS. 21 and 22, a wrapper 1040', preferably made of seal wrap, shrink wrap, seal tape, or any other suitable deformable material, is provided about the stack of cell segments (i.e., cell segments 1022 and 1122), such that the terminal electrode layers (i.e., positive electrode layer 1014 and negative electrode layer 1038) are exposed (via conductive substrates 1016 and 1036, respectively), and such that a solely outer-edge clamping arrangement is provided by wrapping the wrapper about the contents of the stack to provide a bi-polar battery 1050'. The stack of cell segments, as wrapped by wrapper 1040', is preferably placed inside a rigid container 1060' whose cross-sectional area is similar in shape but somewhat larger than that of the wrapped stack. Once the wrapped stack is placed inside the rigid container 1060', any suitable fluid 1070' that expands when under pressure, such as air, water, or foam, for example, is filled into the container 1060' about the wrapper 1040'. The container may then be sealed and its enclosed fluid 1070' may be pressurized such that it expands to provide pressure inward about the entire surface area of wrapper 1040' in the direction of arrows $P_s$ for tightening wrapper 1040' about the stack of cell segments. This pressure maintains the sealed relationship between each gasket and the substrates adjacent thereto in the stack for creating substantially fluid tight barriers about each electrolyte layer of battery 1050', which may be subsequently removed from container 1060'.

Although each of the above described and illustrated embodiments of the bi-polar battery show a battery formed by stacking substrates that are round into a cylindrical battery, it should be noted that any of a wide variety of shapes may be utilized to form the substrates of the bi-polar battery of the invention. For example, the bi-polar battery of the invention may be formed by stacking substrates with cross-sectional areas that are rectangular, triangular, hexagonal, or any other imaginable shape, including those with one or more empty spaces within a plane, such as a "figure-8" (see, e.g., battery 2050, having wrapper 2040', BPU 2102, and MPUs 2012 and 2032, in FIGS. 23 and 24), for example.

Thus, it is seen that a bi-polar battery has been provided with a positive electrode unit, a negative electrode unit, at least one bi-polar electrode unit stacked therebetween, an electrolyte layer separating each adjacent electrode unit, and a gasket positioned about each electrolyte layer for creating a seal about the electrolyte layer in conjunction with the electrode units adjacent thereto. It should be noted that the materials, shapes, and sizes of the electrode units, electrolyte layers, and gaskets described above are only exemplary. One skilled in the art will appreciate that the invention can be practiced by other than the described embodiments, which are presented for purposes of illustration and not of limitation, and the invention is limited only by the claims which follow.

What is claimed is:

1. A bi-polar battery comprising:
a positive mono-polar unit having a positive active material on a positive terminal electrode layer;
a negative mono-polar unit having a negative active material on a negative terminal electrode layer;
at least one bi-polar unit arranged substantially vertically in a stack between said positive mono-polar unit and said negative mono-polar unit, each bi-polar unit comprising:
a bi-polar electrode layer having two sides,
a positive active material on a first side of the bi-polar electrode layer, wherein the positive active material of a respective polar unit opposes the negative active material of an adjacent polar unit, and
a negative active material on a second side of the bi-polar electrode layer, wherein the negative active material of a respective polar unit opposes the positive active material of an adjacent polar unit;
an electrolyte layer comprising an electrolyte material positioned between each of said substantially vertically adjacent polar units, wherein the electrolyte layer further comprises a barrier material that electrically isolates the electrode layers of adjacent polar units between which the electrolyte layer is positioned; and
a sealing ring positioned substantially around each electrolyte layer, wherein said sealing ring is configured to align each of said adjacent polar units, wherein the polar units, the electrolyte layers, and the sealing rings are arranged in a stacked structure in which the positive mono-polar unit is positioned on one end of the structure and the negative mono-polar unit is positioned on the opposite end of the structure, and wherein a clamping force is exerted on the stacked structure to cause the sealing rings to be positioned substantially around the electrolyte layers, the positive active material of at least one polar unit, and the negative active material of an adjacent polar unit, thereby sealing the electrolyte layer.

2. The bi-polar battery of claim 1 wherein the sealing ring contacts each respective pair of adjacent polar units.

3. The bi-polar battery of claim 2 wherein the contact surface areas between the sealing ring and each respective pair of adjacent polar units are reciprocally chamfered.

4. The bi-polar battery of claim 2, further comprising grooves formed along the surface areas of the sealing ring and each respective pair of adjacent electrode units at their respective point of contact with one another, thereby increasing the size of the contact area.

5. The bi-polar battery of claim 4 wherein the increased size of the contact area creates a path of greater resistance for any fluid attempting to break the seal created between the sealing ring and each respective pair of adjacent polar units.

6. The bi-polar battery of claim 4 wherein the grooves align to create a continuous contact surface area between the sealing ring and each respective pair of adjacent polar units.

7. The bi-polar battery of claim 4 wherein the grooves formed along the surface areas of the sealing ring and each respective pair of adjacent polar units at their point of contact with one another aid in the self-alignment of the sealing ring with respect to the polar units stacked thereupon.

8. The bi-polar battery of claim 4 wherein the grooves form a path about the sealing ring and each respective pair of adjacent polar units that is at least one of smooth and continuous, jagged and continuous, or non-continuous.

9. The bi-polar battery of claim 4 wherein the cross-sectional area of the grooves is at least one of sinusoidal, V-shaped, or rectangular.

* * * * *